United States Patent Office 3,635,952
Patented Jan. 18, 1972

3,635,952
CONVERSION OF OXEPANE TO
HEXAMETHYLENIMINE
Donald A. Tyssee and John P. Petrovich, St. Louis, Mo.,
assignors to Monsanto Company, St. Louis, Mo.
No Drawing. Filed Sept. 18, 1969, Ser. No. 859,176
Int. Cl. C07b 1/00; C07d 41/02
U.S. Cl. 260—239 B      2 Claims

ABSTRACT OF THE DISCLOSURE

Hexamethylenimine is produced by bringing oxepane and ammonia in the vapor phase into contact with an activated alumina catalyst at a temperature between about 150° and 550° C. Hexamethylenimine is a useful chemical intermediate, e.g., it may be converted to hexamethylenediamine which is a monomer in the manufacture of nylon 66. Also, it is useful in herbicide and insecticide compositions.

BACKGROUND OF THE INVENTION

It is known that hexamethylenimine is formed as a by-product in commercial processes presently employed for the manufacture of hexamethylenediamine in which either adiponitrile is reduced of 1,6-hexanediol is aminated. However, these processes are a roundabout and expensive means for preparing hexamethylenimine due to the cost of starting materials.

The primary object of the present invention is to provide a novel and economically feasible process for the production of hexamethylenimine.

Other objects of the invention will become apparent from the following description thereof.

SUMMARY OF THE INVENTION

In accordance with the present invention a novel process for preparing hexamethylenimine is provided which comprises bringing oxepane and ammonia in the vapor phase into contact with an activated alumina catalyst at temperatures ranging from about 150° to 550° C. and preferably at a temperature between about 300° and 400° C. Heretofore, methods for preparing hexamethylenimine have involved a straight chain, six carbon atom organic compound containing terminal function groups, i.e., hydroxyl or nitrile groups or a combination of these groups.

An advantage of the process of the invention is that the starting material, oxepane having the structural formula

is obtained in excellent yields from acrolein (acrolein→acrolein dimer→tetrahydropyran - 2-methanol→oxepane) with little by-product formation thereby eliminating expensive isolation and purification steps. Moreover, acrolein provides a relatively inexpensive starting material.

The one-step conversion of oxepane to hexamethylenimine is surprising and unexpected since the rate of cyclization to form five- and six-membered ring compounds takes place 800 to 3200 times faester than cyclization to form seven-membered ring compounds. Thus, it would be expected that the oxepane ring (seven-membered ring) would open, when reacted with ammonia in the presence of a suitable catalyst known to convert ethers to amines, and remain open to yield substantial amounts of acyclic structures (e.g., 1-amino-6-hexanol and hexamethylenediamine) rather than opening and closing to yield substantial amounts of hexamethylenimine.

DESCRIPTION OF THE PREFERRED EMBODIMENTS

The process is carried out in the vapor phase at temperatures ranging from about 150° C. to about 550° C. with temperatures between 300° and 400° C. being preferred. Any appropriate apparatus may be employed although the process is most conveniently carried out in an apparatus adapted for continuous operations. Thus, a stream of oxepane and ammonia is passed through a suitably heated tubular reactor packed with activated alumina. Conveniently the oxepane is volatilized in a heater prior to introduction into the reactor. The process may be carried out at near atmospheric or subatmospheric pressures so long as the reactants are maintained in the vapor phase and there is a sufficient pressure differential across the reactor to maintain a flow of materials.

The rate at which the oxepane and ammonia are each fed into the reactor may vary over a wide range. The feed ratio of ammonia gas to liquid oxepane may vary considerably, for example, between 10,000:1 to 100:1. Generally, a ratio between 3000:1 to 500:1 is satisfactory. Optimum flow rates of the feed materials can be easily determined and will depend on the process conditions and equipment employed.

The following examples are given to more fully illustrate the invention. However, the examples are not intended to in any way limit the invention.

EXAMPLE 1

This example illustrates one method by which oxepane may be produced.

A ½-inch reactor tube was packed to a depth of 13 inches with a catalyst consisting of 13% alumina-87% silica. Tetrahydropyran-2-methanol in the vapor phase was passed into the reactor at the rate of 12.5 ml./hr. at sufficient pressure to maintain this flow rate using hydrogen as a carrier gas. The catalyst was kept at a temperature of 350° C. The effluent from the reactor was passed into a second tubular reactor packed with a nickel catalyst. The catalyst temperature of this reactor was maintained at 110° C. The effluent from the second reactor was collected in a flask cooled to −78° C. by means of a Dry Ice/acetone bath. Oxepane (boiling point 125° C.) was then separated from the resulting liquid by fractional distillation. The yield of oxepane, based on the moles of tetrahydropyran-2-methanol converted was 75.5%.

EXAMPLE 2

A ½-inch reactor tube was packed to a depth of 27 inches with activated alumina and heated to a temperature of 350° C. Ten ml./hr. of liquid oxepane and 500 ml./min. of ammonia were fed into the reactor. The effluent from the reactor was analyzed by vapor phase chromatograph. The results of the analysis showed that 30% of the oxepane was converted to products of which 74% was hexamethylenimine.

When the process is repeated at a temperature of 300° C. or 400° C. similar results are also obtained.

Many variations in the process may be employed without departing from the scope or spirit of the invention.

For example, the feed rate of the materials through the reactor may be varied to accommodate the size and design of existing equipment, or an inert gas dilutent (e.g., hydrogen or nitrogen) may be employed.

What is claimed is:

1. A process for the production of hexamethylenimine which comprises bringing oxepane and ammonia in the vapor phase into contact with an activated alumina catalyst at a temperature between about 150° C. and 550° C.

2. The process of claim 1 wherein the temperature is between 300° and 400° C.

References Cited

UNITED STATES PATENTS 3,270,059    8/1966    Winderl et al. _____ 260—239

FOREIGN PATENTS 738,448    7/1943    Germany _____ 260—239

ALTON D. ROLLINS, Primary Examiner

U.S. Cl. X.R.

260—333